United States Patent [19]

Gabrielson

[11] Patent Number: 5,644,067

[45] Date of Patent: Jul. 1, 1997

[54] APPARATUS AND METHOD FOR CALIBRATION OF SENSING TRANSDUCERS

[75] Inventor: Thomas B. Gabrielson, Warminster, Pa.

[73] Assignee: The United States of America as represented by the Secretary of the Navy, Washington, D.C.

[21] Appl. No.: 682,033

[22] Filed: Jul. 16, 1996

[51] Int. Cl.[6] .................................................. G01L 25/00
[52] U.S. Cl. .................................................. 73/1.39; 73/1.41
[58] Field of Search .......................... 73/1 D, 1 DV, 73/2, 1 B, 1 C

[56] References Cited

U.S. PATENT DOCUMENTS 5,203,199  4/1993  Henderson et al. .................. 73/1 D

OTHER PUBLICATIONS

"Shock and Vibration Handbook" Third Edition, McGraw-Hill, 19, Ch. 18, pp. 16–18, 34–35.

H.M. Trent, "The Absolute Calibration of Electro–Mechanical Pickups", Journal of Applied Mechanics, 1948, pp. 49–52.

Sanford P. Thompson, "Reciprocity Calibration of Primary Vibration Standards", The Journal of the Acoustical Society of America, Sep. 1948, pp. 384–389.

Mark Harrison et al, "The Reciprocity Calibration of Piezoelectic Accelerometers", The Journal of the Accoustical Society of America, Jul. 1952, pp. 637–640.

*Primary Examiner*—Robert Raevis
*Attorney, Agent, or Firm*—Susan E. Verona; Ron Billi

[57] ABSTRACT

Reciprocity calibration of electromechanical transducers is carried out with three transducers, which are secured to a mass mounted for oscillation as a pendulum. A first transducer is driven and the electrical output of a second transducer is measured. A third transducer, which must be a linear, reciprocal device, is driven and the electrical output of the second transducer is measured. The first transducer is driven while the electrical output of the third transducer is measured. The sensitivities of the transducers can be deduced from the electrical inputs and the measured electrical outputs by taking advantage of reciprocity. The transducers may be mounted to the pendulum mass two at a time, or alternatively, all three transducers may be fixed to the pendulum mass.

17 Claims, 5 Drawing Sheets

APPARATUS AND METHOD FOR CALIBRATION OF SENSING TRANSDUCERS

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

This invention relates generally to the calibration of electromechanical sensing transducers, and more particularly to an improved method and apparatus for the calibration of linear inertial or vibration sensors such as accelerometers, geophones, velocity sensors and dynamic displacement sensors.

Reciprocity calibration is a technique used for the absolute calibration of a transducer, i.e. calibration without reference to a standard. It is used primarily for the high-precision calibration of primary standards, and is carried out by using an additional transducer, an electromechanical driver capable of vibrating both transducers simultaneously, and a known mass capable of being connected rigidly to both transducers. At least one of the two transducers must be a linear, reciprocal device. That is, its electrical response to a mechanical excitation corresponds to its mechanical response to an electrical excitation. More particularly, an electromechanical transducer is a linear device if its steady state performance conforms to the linear equations $$I = aE + bV$$

and $$F = \pm cE + dV$$

where

I is the electrical current in the transducer;

E is the voltage across the transducer;

V is the velocity of the transducer;

F is the force exerted by (or applied to) the transducer; and a, b, c and d are parameters of the transducer expressible as complex impedances.

It is a reciprocal device if its transfer impedances b and c are equal.

In the calibration procedure, electrical quantities are measured using three different experimental setups.

First, both transducers are vibrated simultaneously by the electromechanical driver and their respective open circuit voltages E' and E" are measured. The ratio of their sensitivities, S' and S", is determined in accordance with the equation $$\frac{S'}{S''} = -\frac{E'}{E''}$$

Then, the two transducers are connected together mechanically and the transfer admittance $Y_1$ is determined by driving one of the transducers electrically and measuring the driving current $I_1'$ and the open circuit voltage $E_1''$ generated in the other transducer. Thus, $$Y_1 = \frac{I_1'}{E_1''}$$

After $Y_1$ is measured, a known mass M is rigidly clamped to the mechanical sides of both transducers, the first transducer is again driven electrically by a driving current $I_2'$ and the open circuit voltage $E_x''$ generated in the second transducer is measured. This yields a second transfer admittance:

$$Y_2 = \frac{I_2'}{E_2'''}$$

It can be shown that the sensitivities of the transducers are given by the equations $$S' = \mp \sqrt{\frac{E'}{E'''} \cdot \frac{j\omega M}{Y_2 - Y_1}}$$

and $$S'' = \pm \sqrt{\frac{E'}{E'''} \cdot \frac{j\omega M}{Y_2 - Y_1}}$$

Further details on reciprocity calibration can be found in H. M. Trent, *The Absolute Calibration of Electromechanical Pickups*, Journal of Applied Mechanics 15, pp. 49–52 (1948), which is here incorporated by reference.

The standard method of reciprocity calibration is highly precise, and can be used well into the kilohertz region. However, because it requires three different mechanical setups and an expensive electromechanical driver, it is carried out infrequently. It is used primarily for the calibration of primary standards, and is not considered generally suitable for routine calibration of vibration sensors.

SUMMARY OF THE INVENTION

The general object of this invention is to provide a simple and inexpensive apparatus and method usable for the routine calibration of sensing transducers, using reciprocity.

It is also an object of the invention to provide for rapid and efficient reciprocity calibration.

Another object is to provide a reciprocity calibration apparatus that is rugged and easily transported.

Another object is to provide a reciprocity calibration apparatus capable of accommodating a variety of sensors, including heavy sensors.

Still another object is to provide a simple and convenient apparatus and method for reciprocity calibration which is capable of high precision.

In accordance with the invention, calibration is carried out by mechanically coupling first, second and third transducers to a mass supported so that the mass, and the transducers coupled to it at any given time, constitute the weight of a pendulum capable of free oscillation. At least the third transducer must be a linear, reciprocal device. While at least the first and second transducers are coupled to the supported mass, the first transducer is driven with a known electrical input and the electrical output of the second transducer is measured. Similarly, while at least the second and third transducers are coupled to the supported mass, the third transducer is driven with a known electrical input while the electrical output of the second transducer is measured. While at least the first and third transducers are coupled to the supported mass, the first transducer is driven with a known electrical input while the electrical output of the third transducer is measured. The sensitivity of at least one of the transducers is determined from the known electrical inputs and the measured electrical outputs, by taking advantage of reciprocity.

The measurement steps need not be carried out in any particular sequence, and the calibration procedure can be carried out by affixing transducers, two at a time, to the supported mass, and interchanging them in order to carry out the three measurements. However, in a preferred embodiment, all three transducers remain fixed to the supported mass. The mass is preferably a pendulum suspended for horizontal oscillation by flexible cords from four fixed points, or by leaf springs comprising strips of spring metal extending upwardly from a base, or for vertical oscillation by a resilient, stretchable suspension.

Whichever way it is carried out, the calibration procedure eliminates the need for an expensive electromechanical driver. When all three transducers are fixed to the mass, the process has the further advantage that the entire calibration can be carried out with a single mechanical set-up; all three measurements can be carried out without changing the relationships of the transducers to the mass or to one another.

Other objects, advantages and novel features of the invention will become apparent from the following detailed description of the invention, when considered in conjunction with the accompanying drawings.

DESCRIPTION OF THE PREFERRED EMBODIMENTS

Figure 1:
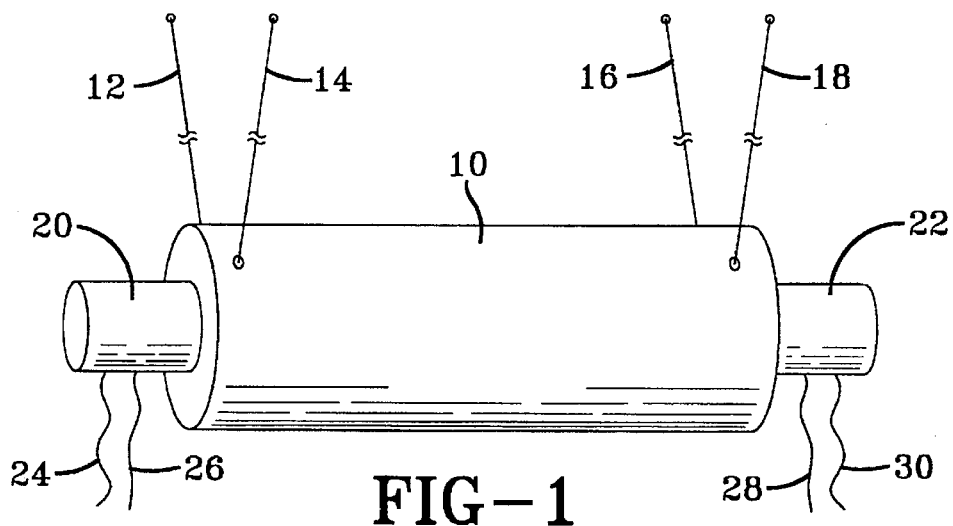
FIG. 1 is an isometric view of a suspended mass with two transducers affixed to it to carry out a step of the calibration process in accordance with the invention.
Figure 2:
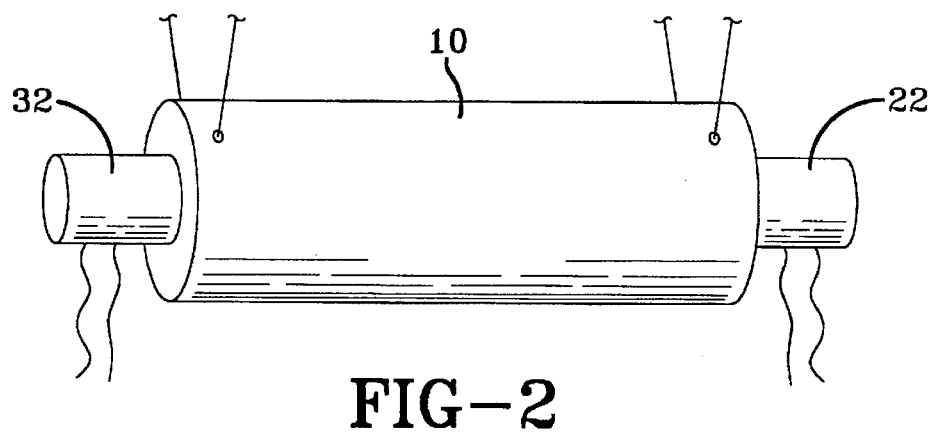
FIGS. 2 and 3 are isometric views, similar to FIG. 1, illustrating second and third steps in the calibration process.
Figure 3:
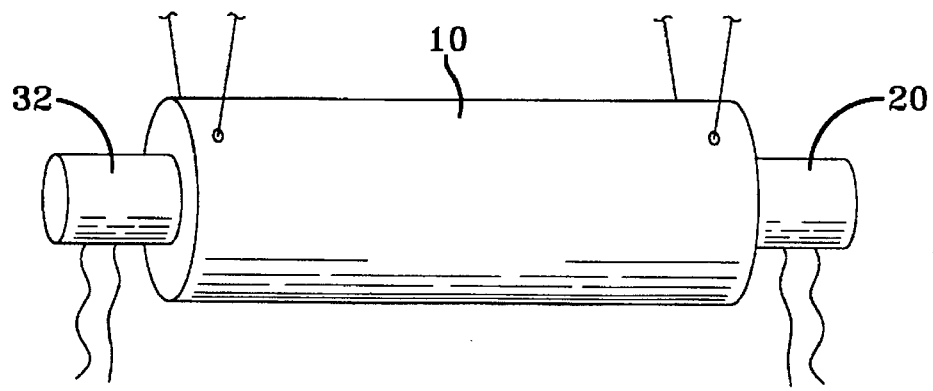

FIGS. 1, 2 and 3 illustrate three experimental set-ups used to carry out calibration in accordance with a first embodiment of the invention. These experiments can be carried out in any desired sequence.

In the experimental set-up of FIG. 1, a cylinder 10 of known mass suspended by four flexible cords 12, 14, 16 and 18 from a supporting framework (not shown). The cords are arranged to permit the cylinder to swing freely in a circular arc while maintaining the axis of the cylinder horizontal to eliminate rotational inertia terms from the effective mass. A first electromechanical transducer 20 is mechanically coupled to one end of the cylinder 10, while a second electromechanical transducer 22 is mechanically coupled to the opposite end of the cylinder. Preferably, in order to avoid bending modes in the cylinder, the two transducers are mounted in alignment with the axis of the cylinder. Electrical connections are made to the transducers through highly flexible leads 24, 26 and 28, 30. Transducer 20 is energized electrically through leads 24 and 26 by a known electrical input, and the electrical output of transducer 22 is measured through leads 20 and 30. The input of transducer 20 can be measured as a current. The electrical output of transducer 22 can be measured as an open circuit voltage e. The pendulum is driven by the inertial reaction force produced by the internal moving mass of the drive transducer.

In the experimental set-up illustrated in FIG. 2, a third transducer 32 is substituted for transducer 20. This third transducer must be a linear, reciprocal device. That is, it must conform to the equations $$I = aE + bV$$

$$F = \pm cV + dE$$

and $$b = -c$$

In FIG. 2, transducer 32 is energized by a known electrical input, and the electrical output of transducer 22 is measured.

In FIG. 3, transducer 20 is substituted for transducer 22, and transducer 20 is again energized by a known electrical input while the electrical output of transducer 32 is measured.

In the following discussion, it is assumed that all three transducers have the same mass, so that the pendulum mass is the same for all three measurements. Differences in the pendulum mass for the different measurements may be taken into account by making adjustments in the calculations of sensitivity in the manner discussed following the example given at the end of this specification.

The receiving response $\alpha$ of a transducer can be taken as its open-circuit voltage e divided by the velocity v of its case:

$$\alpha = \left(\frac{e}{v}\right)_{i=0}$$

The transmitting response $\beta$ of a transducer mounted on a pendulum can be taken as the velocity v of the pendulum on which it is affixed, divided by its input current i:

$$\beta = \left(\frac{v}{i}\right)_P$$

The subscript P denotes that the value of $\beta$ refers to the transmitting response of the transducer mounted on the pendulum.

The three experiments described above yield three equations for four unknowns: the receiving responses of transducers 22 and 32, and the transmitting responses of transducers 20 and 32. A fourth equation, enabling the solution, comes from the relationship between the receiving and transmitting responses of transducer 32.

In the following discussion, S refers to transducer 20, R refers to transducer 22, and T refers to transducer 32. A, B and C refer to the successive measurements.

For the first measurement (measurement A), illustrated in FIG. 1, transducer 20 is driven by a current $i_{SA}$, and the open-circuit voltage $e_{RA}$ of transducer 22 is measured. The input current may be measured by the voltage drop across a reference resistor $R_O$ in series with transducer 20. Thus, $$e_{RA} = \frac{e_{SA}}{R_0} \beta_S \alpha_R$$

To make absolute measurements of voltages unnecessary, this measurement can be expressed as the ratio of two voltages $$[SR] \equiv \frac{e_{RA}}{e_{SA}} = \frac{\beta_S \alpha_R}{R_0}$$

The ratio SR would also be the transfer function as measured by a two-channel spectrum analyzer. If the spectrum analyzer has a swept-sine mode or random noise excitation, the measurements can be made rapidly over wide bands.

The second measurement (measurement B), illustrated in FIG. 2, is carried out by driving transducer 32 with a known current and measuring the open-circuit output voltage of transducer 22, which will now be referred to as $e_{RB}$. The ratio [TR] is similarly expressible as a voltage ratio:

$$[TR] \equiv \frac{e_{RB}}{e_{TB}} = \frac{\beta_T \alpha_R}{R_0}$$

The third measurement (measurement C), illustrated in FIG. 3, is carried out by driving transducer 20 with a known current and measuring the open-circuit output voltage of transducer 32, which will now be referred to as $e_{TC}$. The ratio [ST] is expressible as a voltage ratio:

$$[ST] \equiv \frac{e_{TC}}{e_{SC}} = \frac{\beta_S \alpha_T}{R_0}$$

From the equations for [SR], [TR] and [ST], it can be shown that the product of the receiving and transmitting responses of the reciprocal transducer 32 is $$\alpha_T \beta_T = R_0 \frac{[ST][TR]}{[SR]}$$

Figure 10:
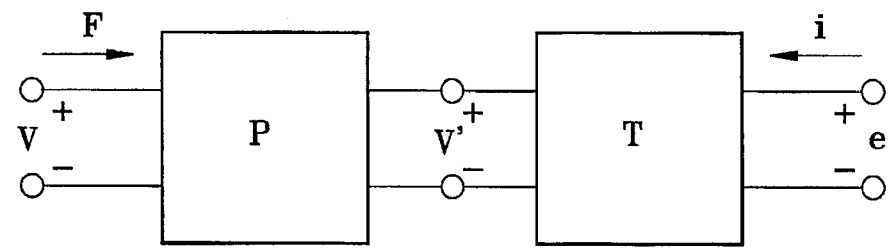
FIG. 10 is a schematic diagram representing a transducer and a suspended mass as two, two-port networks coupled together.

The relationship between $\alpha_T$ and $\beta_T$ is obtained from reciprocity. If the pendulum is treated as a lumped mass, the connection of the transducer T to the pendulum P can be diagrammed as in FIG. 10. T and P are reciprocal. Consequently, $$\left(\frac{v}{i}\right)_{F=0} = \left(\frac{e}{F}\right)_{i=0}$$

Figure 11:
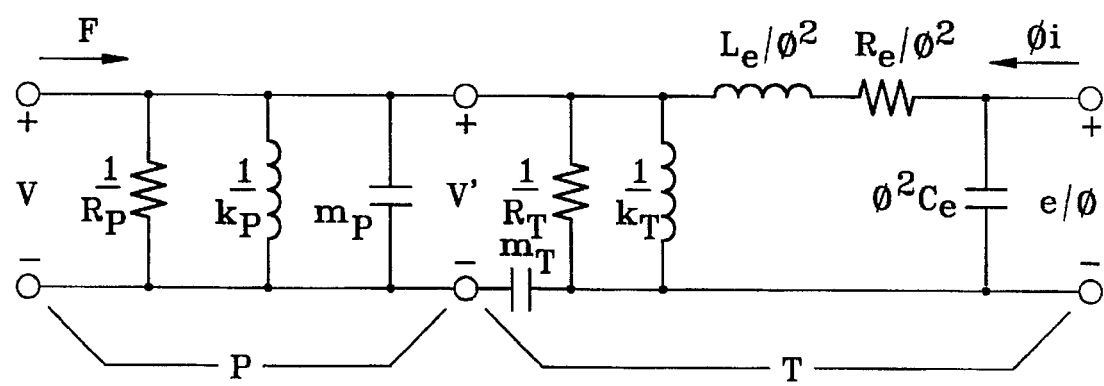
FIG. 11 is a schematic diagram of an electrical equivalent circuit of a suspended mass and a transducer.

The same conclusion can also be reached from the electromechanical equivalent circuit shown in FIG. 11. If $Z_P$ is defined as the transfer impedance F/v' across the pendulum with the transducer T attached, when the applied force is zero, the pendulum velocity for a given current is given by $$v = \beta_T$$

That is, $$\left(\frac{v}{i}\right)_{F=0} = \beta_T$$

and the open circuit output of T for an applied force is $$e = \frac{F}{Z_P} \alpha_T$$

or $$\left(\frac{e}{F}\right)_{i=0} = \frac{\alpha_T}{Z_P}$$

However, since by reciprocity, $$\left(\frac{v}{i}\right)_{F=0} = \left(\frac{e}{F}\right)_{i=0}$$

it follows that $$\beta_T = \frac{\alpha_T}{Z_P}$$

and the receiving sensitivity $\alpha_T$ of the transducer T is given by $$\alpha_T = \sqrt{R_0 Z_P \frac{[ST][TR]}{[SR]}}$$

The arrangement of transducers illustrated in FIGS. 1–3, with two transducers fixed at opposite ends of, and in coaxial relationship with, the cylinder, avoids the excitation of bending modes, and thereby enhances the useful frequency range of the device. However, this configuration requires the rearrangement of the transducers during calibration.

Figure 4:
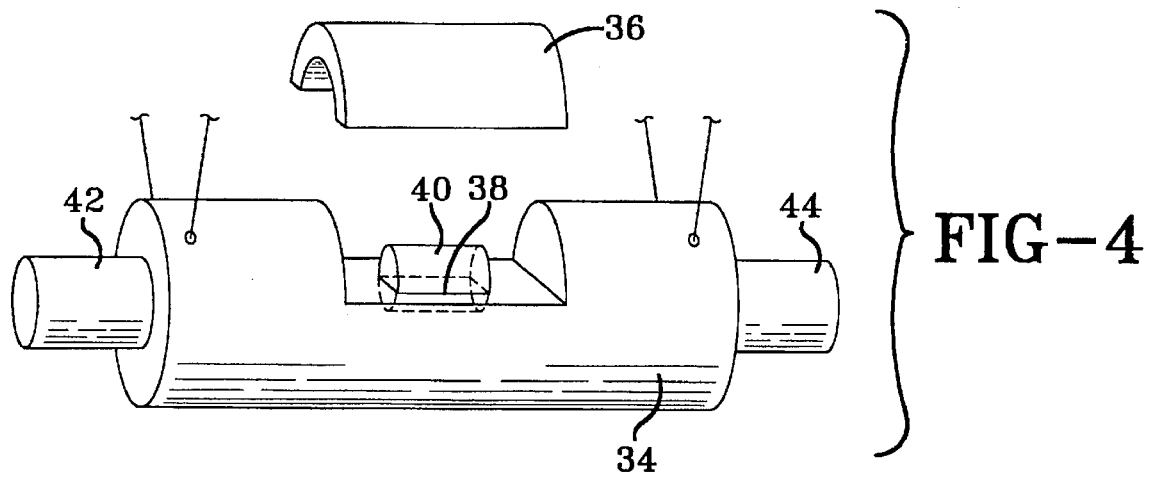
FIG. 4 is an exploded, isometric view of an alternative suspended mass having three transducers affixed to it so that the calibration procedure can be carried out without repositioning the transducers.
Figure 5:
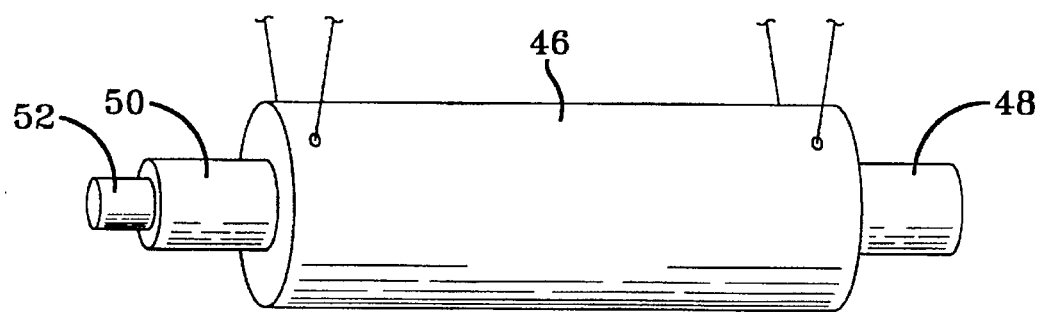
FIG. 5 is an isometric view of a further alternative configuration in which three transducers are affixed to the suspended mass.

To obviate the rearrangement of transducers in the calibration process, all three transducers may be mounted coaxially on a cylinder, as in FIG. 4. Here, the cylinder 34 includes a close-fitting cap 36, which is removable to reveal a recess 38 for receiving a transducer 40. Transducers 42 and 44 are affixed to opposite ends of the cylinder. The cap 36 prevents flexure of the cylinder. With this configuration, all three transducers are coaxially aligned, and can remain in place through the calibration process.

Where crosstalk between transducers is not a problem, then two transducers can be mounted, one on the other, at one end of the cylinder, as shown in FIG. 5, where cylinder 46 has a first transducer 48 at one end, and transducers 50 and 52 at the opposite end. Here, as in FIG. 4, all three transducers are coaxially aligned with one another and with the cylinder. This arrangement is suitable, for example, where both transducers 50 and 52 are piezoelectric transducers, or where one is an electrodynamic transducer and the other is a piezoelectric transducer. However, where the transducers are both electrodynamic, or are not well shielded, the configuration of FIG. 4 is preferred.

Figure 6:
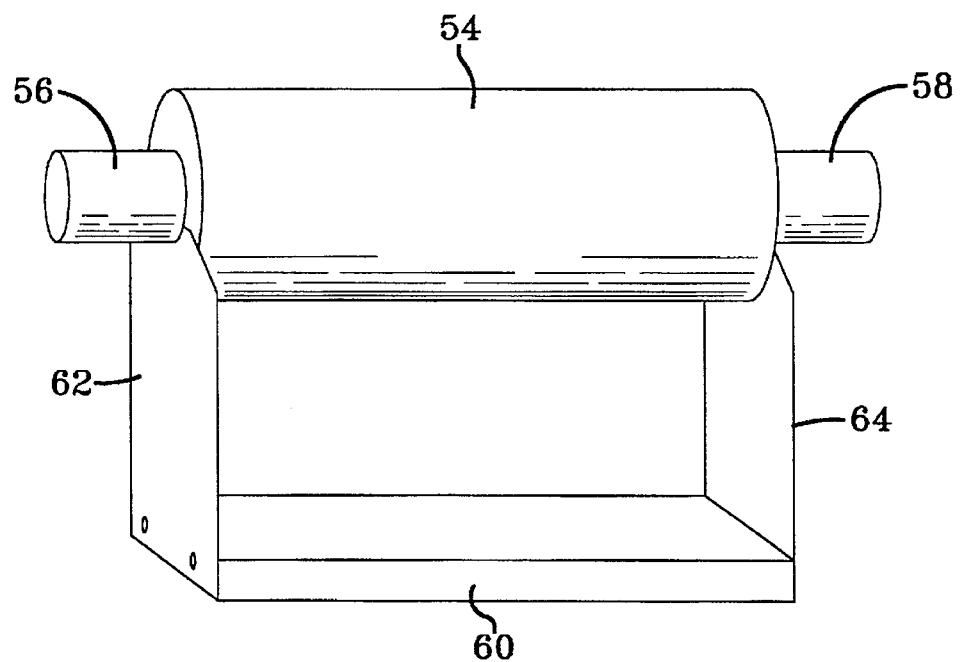
FIG. 6 is an isometric view of a pendulum comprising a mass, with two transducers, supported by leaf springs.

The arrangements shown in FIGS. 1–5 utilize simple fourpoint suspensions. The four point suspension minimizes pitching of the measurement axis and minimizes oscillations perpendicular to the measurement axis. However, for a more compact device, an inverted pendulum can be used, as shown in FIG. 6. Here, a cylinder 54, with transducers 56 and 58 mounted at its opposite ends, is supported from a base 60 by a pair of strips 62 and 64, made of thin sheets of spring metal. The vertical lengths of the strips, i.e. the lengths of the portions of the strips between the locations at which they are clamped to the cylinder and the base, are just short of the point of instability. Consequently, the system has a very low resonance frequency. The strips are situated in planes to which the axis of the cylinder is substantially perpendicular, and these planes are substantially vertical when the cylinder is at rest.

Figure 7:
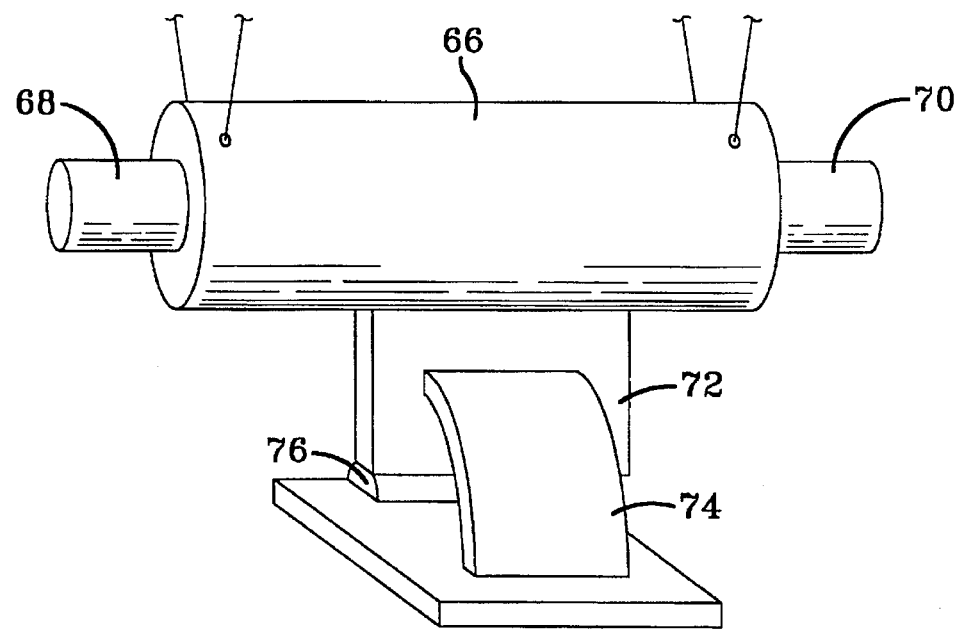
FIG. 7 is an isometric view of a pendulum having an eddy current damper.

Since the fundamental suspension resonances of any of the above-described systems are only weakly damped, measurements at low frequencies require waiting until natural oscillations decay. The measurements can be facilitated by providing artificial damping, as illustrated in FIG. 7. A suspended cylinder 66, having transducers 68 and 70 at its opposite ends, is provided with a downwardly extending copper vane 72 disposed with its faces parallel to the path of oscillation. A magnet is disposed so that its pole pieces 74 and 76 straddle the copper vane. Movement of the cylinder produces eddy currents in the copper vane, which produce the desired damping. After the natural oscillations have decayed, the magnet can be withdrawn (or de-energized, if an electromagnet). With the damping removed, the suspension becomes a high Q suspension, and the measurements are less sensitive to the mechanical properties of the pendulum.

Figure 8:
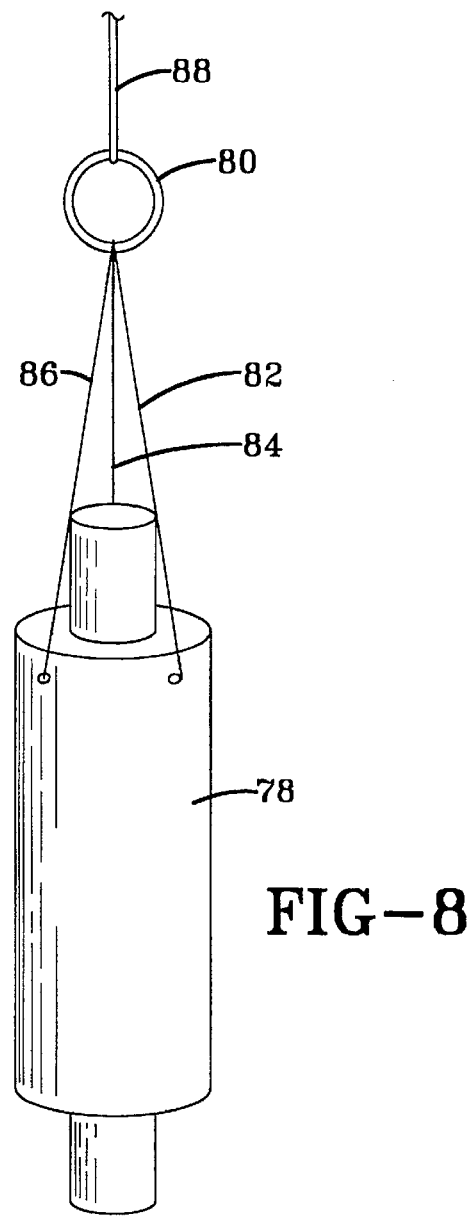
FIG. 8 is an isometric view of a vertically moving pendulum in accordance with the invention.

The cylinder can also be suspended for vertical oscillation. As illustrated in FIG. 8, a cylinder 78 is disposed with its axis vertical, and is suspended from a ring 80 by three wires, 82, 84 and 86, connected from the ring to pins disposed at 120 degree intervals around the perimeter of the cylinder near its upper end. The ring 80 is in turn suspended from a fixed support (not shown) by a length of surgical tubing 88. The mass of the suspended apparatus is typically about 1 kg, and consequently, it is possible to obtain a low fundamental suspension resonance.

Figure 9:
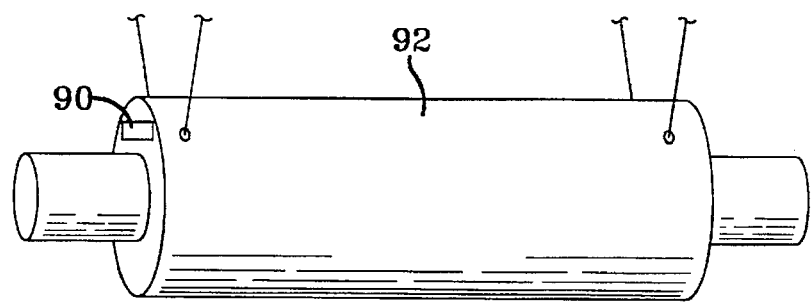
FIG. 9 is a an isometric view of a pendulum in accordance with the invention provided with a mirror for cross-checking calibration by optical interferometry.

To cross-check the calibration measured by the apparatus described, a small mirror may be provided on the cylinder as shown in FIG. 9. A small mirror 90 is fixed to one end of cylinder 92. This mirror is used in conjunction with an optical interferometer. If the Bessel-null optical technique is used, it is unnecessary to maintain a constant mean displacement.

In the case of a system, as shown in FIG. 4, where all three transducers are fixed to the pendulum during all stages of the calibration process, it is generally sufficient to estimate the value of $Z_P$. If the pendulum mass is much greater than the proof mass of the transducer and the measurements are all taken at frequencies much higher than the pendulum oscillation frequency, the pendulum acts as a free mass and the transfer impedance is simply $$Z_P = j\omega m_P$$

where $m_P$ is the mass of the pendulum, including the masses of the three transducers. This approximation breaks down near the pendulum resonance frequency (which can be as low as 0.5 Hz or lower) and also at frequencies so high that the pendulum can no longer be considered a lumped mass.

Various corrections can be made. For example, in the case of a geophone, above its resonance frequency, only the case mass of the geophone, not the proof mass, should be included in $m_P$.

Although not always required, the equation $$\alpha_T = \sqrt{R_0 Z_P \frac{[ST][TR]}{[SR]}}$$

provides both the magnitude and the phase of the receiving response of transducer T.

Once the receiving response $\alpha_T$ is determined, the receiving response of R and the transmitting response of S are:

$$\alpha_R = \alpha_T \frac{[SR]}{[ST]}$$

and $$\beta_S = \beta_T \frac{[SR]}{[TR]}$$

Some care is required in setting up the pendulum to make the measurements easier and more accurate. Where a four-point suspension is used, the pair of suspension cords connected at each end of the cylinder should be disposed in a vertical plane when the pendulum is at rest in order to maintain the axis of the pendulum horizontal. The suspension cords of each pair should also diverge from each other in the upward direction to suppress lateral oscillation. The electrical leads connected to the transducers should be thin, stranded wire, loosely coiled and suspended near the pendulum to minimize their effect on the pendulum dynamics, and to maintain the Q of the pendulum well over 100.

The cylinder should be as short as possible but the transducers must not be so close together that there is significant cross talk between driving and receiving transducers. This can be checked by firmly clamping the bar, or by detaching the geophones and placing them on separate soft pads at the same spacing they would be to each other if mounted on the cylinder. The received signals should be well below those obtained with the transducers mounted on the bar in its freely suspended condition.

For several varieties of geophones, a separation of 15 cm was found to reduce the electromagnetic coupling below the level produced by other sources of coupling. The field of a geophone decays in accordance with the fourth power of the distance, and consequently small increases in spacing result in large decreases in coupling. Care must also be taken to insure that crosstalk does not take place in the analyzer itself. In some cases analyzers exhibit significant channel to channel crosstalk when one of the input signal levels is far less than the other.

If one of the transducers is significantly less sensitive than the one that is required to be a linear, reciprocal device, a lock-in amplifier or some form of synchronous averaging may be necessary to maintain an adequate signal to noise ratio. If a two-channel spectrum analyzer is used, the coherence should be checked to verify a high signal to noise ratio. This is particularly important if random noise excitation is being used. A drop in coherence indicates either a low signal to noise ratio or an overdriven condition in one of the transducers or in its associated electronics.

The assumption that a pendulum acts solely as a free mass is not quite correct. Even at frequencies for which the pendulum can be treated as a lumped element, the dynamics of the transducers that are attached affect the transfer impedance $Z_P$. Returning once more to FIG. 11, which depicts the equivalent circuit for a pendulum with one geophone attached, the transfer impedance can be written as follows:

$$Z_P = j\omega m_P \left( \left[ 1 - \frac{\omega_P^2}{\omega^2} - j\frac{\omega_P}{\omega Q_P} \right] + \frac{m_T}{m_P} \left[ \frac{1 + \frac{j\omega}{\omega_T Q_T}}{1 - \frac{\omega^2}{\omega_T^2} + \frac{j\omega}{\omega_T Q_T}} \right] \right)$$

where $\omega_t$ and $\omega_P$ are the resonant frequencies of the geophone and pendulum respectively, and $Q_T$ and $Q_P$ are the corresponding Qs of those resonances. The electrical components are included, but do not influence the solution for $Z_P$ when the electrical terminals are open-circuited and the frequency is low enough that the intrawinding capacitance acts as an open circuit. The geophone's case mass is included in $m_P$, but $m_T$ refers to the proof mass only. It will be observed that the above equation contains two correction factors for the approximation $$Z_P = j\omega m_P$$

Since it is easy to achieve a pendulum resonance below 1 Hz with a Q of several hundred, the first factor $$\left[1 - \frac{\omega_P^2}{\omega^2} - j\frac{\omega_P}{\omega Q_P}\right]$$

represents a correction of less than 1% for a receiving response above a few Hz.

The second factor $$\left[\frac{1 + \frac{j\omega}{\omega_T Q_T}}{1 - \frac{\omega^2}{\omega_T^2} + \frac{j\omega}{\omega_T Q_T}}\right]$$

starts at unity well below the geophone resonance (typically in the range of 10 to 30 Hz), peaks near the geophone resonance, and drops linearly with frequency above the resonance frequency. The Q of a geophone is nearly one, which means that the maximum magnitude of this correction is less than 2. The relative influence of this correction is determined primarily by the ratio of the geophone's proof mass to the pendulum mass. With a mass ratio of 20:1, the maximum error represented by this term, which would occur at the geophone's resonance frequency, is less than 5%. Because raising the pendulum's mass decreases the signal at the receiving transducer, the mass ratio should not be made higher than necessary to achieve an acceptable level of error.

At frequencies above several hundred Hz, other problems arise. As the frequency increases, a point is reached where the pendulum mass can no longer be approximated as a lumped element. Higher frequencies are attainable by improving pendulum stiffness and insuring that the transducers and pendulum are coaxial to avoid bending modes.

At low frequencies, where geophone dynamics become important, corrections can be made by taking into account the proof mass of a geophone, which is usually known to within about 20%. Corrections can also be achieved by using different mass loadings on the pendulum. However, with care, an accuracy of 5% or better can be obtained over the useful frequency range of the pendulum without these corrections, and this is adequate for many non-precision applications.

EXAMPLE

Two calibrations were carried out on a factory calibrated accelerometer (PCB393A31). In the first calibration, the accelerometer was installed on a pendulum as a receiving transducer, and a calibration was performed using two 10 Hz geophones as the other two transducers. One of these geophones served as the reciprocal device. The pendulum was made from a thin aluminum channel, and the three transducers were not aligned with the center of mass of the channel, so that bending moments were possible. In the second calibration, the pendulum was a solid aluminum cylinder, 2.5 cm in diameter and 15 cm long. Holders were provided for the transducers at the ends of the cylinders so that they could be interchanged. The arrangement, therefore, was similar to that depicted in FIGS. 1–3. The transducers were attached to the cylinder two at a time, and were aligned with the axis of the cylinder to reduce their tendency to excite bending modes.

The reciprocity-derived values for the receiving response (in volts per g of acceleration) and the values from a NIST (National Institute for Standards and Technology) calibration are compared in the following table, in which the values for "Reciprocity A" represent the first calibration, and the values for "Reciprocity B" represent the second calibration.

| Frequency (Hz) | NIST Calibration (volts per g) | Reciprocity A (volts per g) | Reciprocity B (volts per g) |
|---|---|---|---|
| 1 | 10.56 | N/A | N/A |
| 2 | 10.49 | N/A | 10.51 |
| 5 | 10.41 | N/A | 10.49 |
| 10 | 10.30 | N/A | 10.39 |
| 20 | 10.26 | 10.34 | 10.27 |
| 50 | 10.19 | 10.27 | 10.22 |
| 100 | 10.11 | 10.26 | 10.18 |
| 150 | 10.17 | 10.34 | 10.25 |
| 200 | N/A | 10.46 | 10.39 |

With only two transducers mounted on the pendulum at any given time, as in FIGS. 1–3, and in calibration B, the pendulum mass can be different for different measurements. However, the equations for the responses are easily adjusted by introducing an impedance for each measurement configuration. The subscripts on the impedance symbol Z indicate to which measurements the impedance corresponds:

$$\alpha_T^2 = R_0 \frac{[ST] Z_{ZT} [TR] Z_{TR}}{[SR] Z_{SR}}$$

$$\beta_t = \frac{\alpha_T}{Z_{ST}}$$

$$\alpha_R = \alpha_T \frac{[SR] Z_{SR}}{[ST] Z_{ST}}$$

$$\beta_S = \beta_T \frac{[SR] Z_{SR}}{[TR] Z_{TR}}$$

For the calibrations of the accelerometer, the pendulum impedances for [SR] and for [TR] were equal.

A pendulum can no longer be treated as a lumped mass at higher frequencies. For a short bar, the effective mass, treating the bar as a waveguide, is given by $$m_{eff} = \rho V \frac{\tan(kx)}{kx}$$

where

ρ is the density of the bar;

V is the volume of the bar;

k is the wave number in the bar ($\omega/c$); and x is the length of the bar. For example, for $kx=0.17$, the effective mass is 1% greater than the actual mass. For a sound speed of 5050 m/s, as in aluminum, and a length of 15 cm, this would correspond to a frequency of 900 Hz. A correction for the effective mass is easily incorporated into $Z_P$.

There are at least three areas in which correctable errors can appear: the electromagnetic coupling from the driving transducer to the receiving transducer must be reduced to a level well below the mechanical coupling through the pendulum; the dynamic behavior of the pendulum must be known well enough that corrections near the pendulum resonance or wave corrections at high frequency can be made and spurious resonances must be minimized; and the true open circuit voltage must be determined. The last concern is usually minor, but, with a 7800 ohm coil resistance, for example, a parallel analyzer and oscilloscope create a load of 500,000 ohms, which introduces an error of about 1.5% in the open circuit voltage reading.

Various modifications can be made to the apparatus and method described above. For example, while the pendulum mass is preferably in the form of a cylinder, even fairly crude fixtures, e.g. metal channels with transducers clamped to them, can produce calibrations to within 5% up to several hundred Hz. However, carefully made coaxial fixtures can produce considerably better results to well beyond 1 kHz so long as appropriate corrections are made.

Many other modifications and variations of the invention are possible in view of the above disclosure. It is therefore to be understood that, within the scope of the appended claims, the invention may be practiced other than as specifically described.

I claim:

1. The process of calibrating an electromechanical transducer comprising:

mechanically coupling first, second and third transducers to a mass supported so that the mass, and the transducers coupled to it at any given time, constitute the weight of a pendulum capable of free oscillation, at least the third transducer being a linear, reciprocal device;

while at least the first and second transducers are coupled to the supported mass, driving the first transducer with a known electrical input while measuring the electrical output of the second transducer;

while at least the second and third transducers are coupled to the supported mass, driving the third transducer with a known electrical input while measuring the electrical output of the second transducer;

while at least the first and third transducers are coupled to the supported mass, driving the first transducer with a known electrical input while measuring the electrical output of the third transducer; and determining the sensitivity of at least one of said transducers from the known electrical inputs and the measured electrical outputs.

2. The process according to claim 1 in which the three measurements are carried out while all three transducers are coupled to the supported mass in the same relationship to the supported mass and to one another.

3. The process according to claim 1 in which the three measurements are carried out while all three transducers are coupled to the supported mass in the same relationship to the supported mass and to one another, and in which said mass comprises a cylinder having opposite ends and a cylindrical external surface, and a central axis extending through the two ends and parallel to the external surface, and in which the first transducer is fixed to the cylinder at one end thereof, the second transducer is fixed to the cylinder at the other end thereof, the third transducer is fixed within the cylinder at a location between, and spaced from, said first and second transducers, and all three transducers are aligned with said central axis.

4. The process according to claim 1 in which said mass comprises a cylinder having two opposite ends and a cylindrical external surface, and a central axis extending through the two opposite ends and parallel to the external surface, the cylinder being disposed with its central axis horizontal and suspended by flexible cords from four points, a first pair of the cords being connected to the cylinder adjacent to one of said ends and being situated, when the cylinder is at rest, in a first vertical plane to which said axis is perpendicular, the other pair of the cords being connected to the cylinder adjacent to the other one of said ends and being situated, when the cylinder is at rest, in a second vertical plane to which said axis is perpendicular, and the cords of each pair diverging from each other in the upward direction, whereby the central axis is maintained substantially horizontal and in a fixed vertical plane.

5. The process according to claim 1 in which said mass comprises a cylinder having two opposite ends and a cylindrical external surface, and a central axis extending through the two opposite ends and parallel to the external surface, the cylinder being disposed with its central axis horizontal and supported by a pair of flexible spring metal strips from a base located underneath the cylinder, the spring metal strips, when the cylinder is at rest, being substantially vertical and disposed substantially in planes to which the central axis is perpendicular.

6. The process according to claim 1 in which said mass comprises a cylinder having two opposite ends and a cylindrical external surface, and a central axis extending through the two opposite ends and parallel to the external surface, the cylinder being disposed with its central axis vertical and having means for suspending said cylinder for vertical oscillation along the direction of said central axis.

7. The process according to claim 1 in which oscillations of the supported mass are damped before each time one of said transducers is driven.

8. An apparatus for calibrating electromechanical transducers comprising a mass, three transducers fixed to said mass in spaced, relationship to one another and aligned with one another along an axis, whereby mechanical movement produced by any of said transducers is transmitted through the mass, along said axis, to each of the other transducers, at least one of said transducers being a linear, reciprocal device, and means for supporting said mass and the three transducers fixed thereto as a pendulum for free oscillation in a direction to which said axis is tangent.

9. An apparatus according to claim 8 in which the mass is a cylinder having opposite ends and a cylindrical external surface, said axis is a central axis extending through said opposite ends and parallel to the external surface, in which one of said transducers is fixed to the cylinder at one end thereof, another of said transducers is fixed to the cylinder at the other end thereof, and a third one of said transducers is fixed to the cylinder and disposed within the cylinder at a location between, and spaced from, said first and second transducers.

10. An apparatus according to claim 9 in which the cylinder has an internal space for receiving said third transducer, an opening in said cylindrical external surface for providing access to said internal space, and cap means for closing said opening, the cap means forming part of the exterior of the cylinder and closely fitting the opening and thereby rigidifying the cylinder.

11. An apparatus for calibrating electromechanical transducers comprises at least two transducers, at least one of which is a linear, reciprocal device, a cylinder having a cylindrical external surface and two opposite ends, and a central axis extending through the two opposite ends and parallel to the external surface; means mounting two of said transducers to said cylinder on said opposite ends thereof and in alignment with said axis; and means supporting said cylinder, with the transducers mounted thereon as a pendulum capable of oscillating freely in a direction tangent to the direction of said central axis.

12. An apparatus according to claim 11 in which the cylinder is disposed with its central axis horizontal and suspended by flexible cords from four points, a first pair of the cords being connected to the cylinder adjacent to one of said ends and being situated, when the cylinder is at rest, in a first vertical plane to which said axis is perpendicular, the other pair of the cords being connected to the cylinder adjacent to the other one of said ends and being situated, when the cylinder is at rest, in a second vertical plane to which said axis is perpendicular, and the cords of each pair diverging from each other in the upward direction, whereby the central axis is maintained substantially horizontal and in a fixed vertical plane.

13. An apparatus according to claim 11 in which the cylinder is disposed with its central axis vertical.

14. An apparatus according to claim 11 in which the cylinder is disposed with its central axis horizontal and supported by a pair of flexible spring metal strips from a base located underneath the cylinder, the spring metal strips, when the cylinder is at rest, being substantially vertical and disposed substantially in planes to which the central axis is perpendicular.

15. An apparatus according to claim 11 including a third transducer located within said cylinder in alignment with said central axis and in spaced relationship to the transducers on the opposite ends of the cylinder.

16. An apparatus according to claim 11 in which the cylinder has an internal space for receiving a third transducer, an opening in said cylindrical external surface for providing access to said internal space, and cap means for closing said opening, the cap means forming part of the exterior of the cylinder and closely fitting the opening and thereby rigidifying the cylinder.

17. An apparatus according to claim 11 including means, comprising a mirror affixed to the cylinder, for cross checking the calibration of at least one of said transducers by interferometry.

* * * * *